Figure 1:
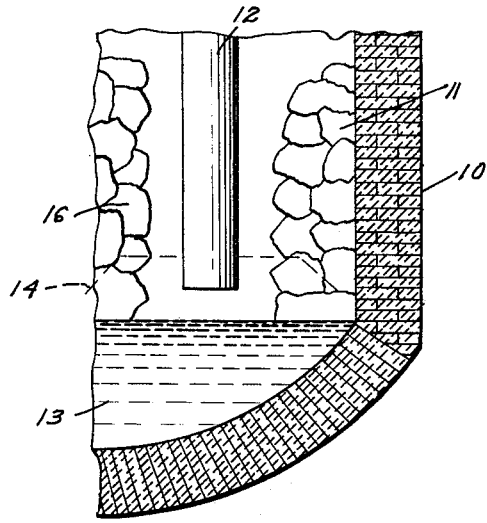

July 9, 1963  C. G. ROBINSON  3,097,252
ELECTRIC ARC CONTROL
Filed Dec. 11, 1959

Inventor
Charles G. Robinson

United States Patent Office 3,097,252
Patented July 9, 1963

3,097,252
ELECTRIC ARC CONTROL
Charles G. Robinson, Sterling, Ill., assignor to Northwestern Steel and Wire Company, Sterling, Ill., a corporation of Illinois
Filed Dec. 11, 1959, Ser. No. 859,010
5 Claims. (Cl. 13—13)

This invention relates to an electrode control system and particularly to a control system for an electrode of an electric arc furnace.

In the average electric furnace shop cold scrap is charged directly into the furnace. The scrap charge may be of random mixtures as to size and weight. Such charges present various melting problems. For example, as a hole is melted down through the scrap, the scrap may be effectively undermined allowing large pieces of scrap to slide down the walls into the fluid metal below the electrode. Occasionally, large pieces of scrap such as formed in this way slide or shift into the electrode column, thus making the electrode draw excessive current. Sometimes the shift of scrap can be so great that the pressure against the electrode will become excessive and cause the electrode column to fracture.

It is an important object of the present invention to provide a control system which will tend to eliminate such violent shifts of scrap and thus tend to protect the electrodes against breakage.

It is another object of the present invention to provide an automatic arc adjusting device for electric furnaces which will provide a much more even power flow and more uniform efficiency.

Another object of the present invention is to provide an arc adjusting device which will automatically provide a longer arc to lower the chances of a cave-in during melt down, and which will automatically move the electrode to a predetermined optimum arc length giving maximum power into the furnace as the furnace settles down to a quiet operation with no violent current swings.

A more general object of the invention is to provide an electrode control system responsive to repeated current surges to adjust the electrode to provide a relatively long arc, and operative in the absence of repeated current surges to adjust the electrode to an optimum arc length.

In accordance with one embodiment of the invention, circuits are provided for sensing the electrode current and voltage, and a control system is responsive to differential current flow in the voltage and current sensing circuits to adjust the position of the electrode. One of the circuits has means for varying its impedance to correspondingly alter the electrode control, and means is provided responsive to current surges to the electrode to actuate the impedance changing means to thus alter the operation of the control system. For example, the resistance of the electrode current sensing circuit may be decreased so as to cause the electrode to generate a longer arc for given electrode current and voltage conditions.

Figure 2:
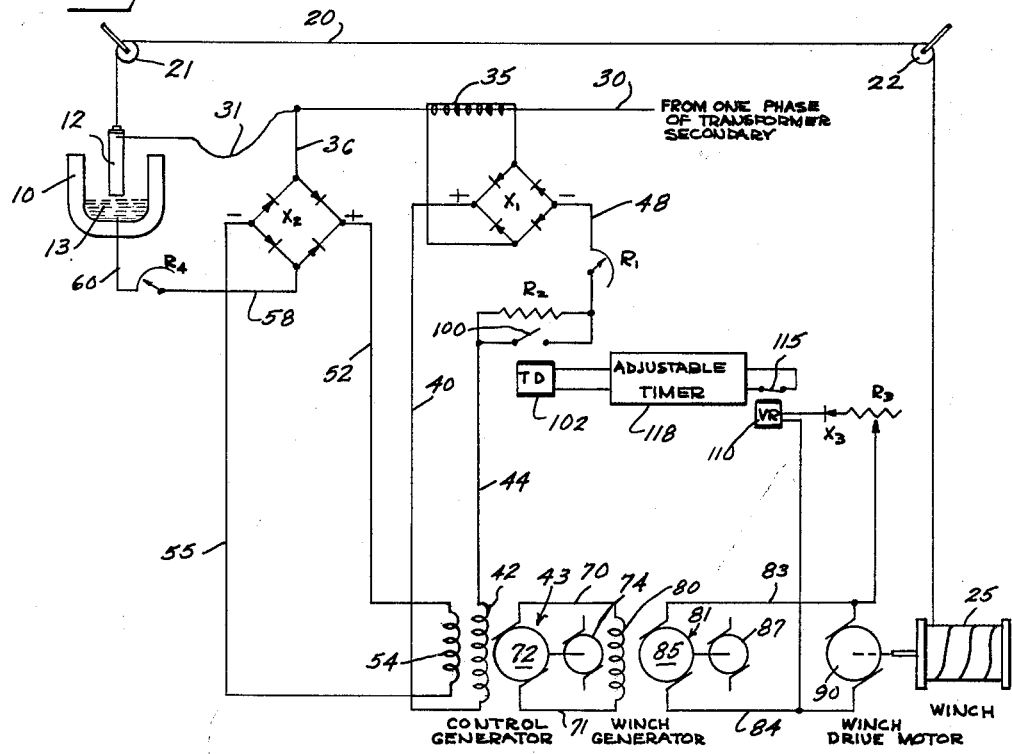

Other objects, features and advantages of the present invention will be apparent from the following detailed description of a preferred embodiment, taken in connection with the accompanying drawings, in which:

FIGURE 1 is a somewhat diagrammatic vertical sectional view showing a portion of an electric arc furnace during melt down; and FIGURE 2 shows an exemplary control system in accordance with the present invention.

As shown on the drawings:

Referring to FIGURE 1, an electric arc furnace 10 may be changed directly with cold scrap as indicated at 11. As power is supplied to the electrode 12 an arc forms between the electrode 12 and the liquid metal 13 in a zone such as generally indicated by the dash line 14.

It will be observed that as the scrap melts within the zone 14, the pile of scrap such as indicated at 11 tends to be undermined and the slide down the walls of the furnace into the liquid metal at the bottom. In this process, large pieces of scrap such as indicated at 16 may slide or shift into the electrode column thus making the electrode draw excessive current and presenting the danger of creating sufficient pressure against the electrode to cause the electrode column to fracture.

Referring to FIGURE 2, the furnace is indicated at 10 and the electrode indicated at 12. It will be understood that in practical installations, a three phase system is used with each of the three electrodes operating independently as the melt progresses.

A cable 20 is illustrated for raising and lowering the electrode 12 relative to the melt 13 and the cable is trained over pulleys 21 and 22 and wound onto a winch 25.

Electric power is supplied to the electrode 12 by means of a line such as indicated at 30 which is connected to one phase of a three phase transformer secondary. The other phases of the secondary are connected to the other two electrodes associated with the furnace 10. The electric line 30 includes a flexible cable part 31 which accommodates the raising and lowering of the electrode 12.

Electrode current is sensed by means of a current transformer 35 coupled to the line 30 at a suitable point, and electrode voltage is sensed by means of a line 36 connected to the line 30 adjacent electrode 12. Rectifier $X_1$ converts the current signal from transformer 35 to a direct current proportional to the electrode current in the line 30, while rectifier $X_2$ provides a voltage signal proportional to the voltage between line 30 and the melt 13. Specifically, the current sensing circuit associated with rectifier $X_1$ comprises a line 40, a current winding 42 of control generator 43, a line 44, a resistor $R_2$, and a rheostat $R_1$ connected by a line 48 to the negative terminal of the rectifier $X_1$. Similarly, the voltage sensing circuit associated with the rectifier $X_2$ comprises a line 52, a voltage winding 54 of control generator 43 and a line 55 connected to the negative terminal of the rectifier $X_2$. The input alternating current terminals of the rectifier $X_2$ are connected to line 36 and to a line 58 which is connected with the melt 13 through a rheostat $R_4$ and a line 60. By suitably adjusting the rheostats $R_1$ and $R_4$ the current flow in the current circuit and in current winding 42 may exactly equal the current flow in the voltage circuit and in voltage winding 54 for predetermined values of electrode current and electrode voltage corresponding to optimum arc length between the electrode 12 and the melt 13.

As will be readily understood by those skilled in the art, the windings 42 and 54 of the control generator 43 are in opposing relation so that with equivalent currents therethrough, there is a net zero field applied to the control generator 43 and a zero output current from the generator in lines 70 and 71. The armature 72 of the control generator is illustrated as being driven by a constant speed motor 74. With zero output from the control generator 43, field winding 80 of the winch generator 81 provides a zero field and thus there is a zero current in lines 83 and 84 connected with armature 85 of the winch generator. The winch generator may be driven from a suitable constant speed motor 87. With a zero output from winch generator 81 winch drive motor 90 is stationary and the winch 25 is stationary.

In normal operation of the system thus far described, if the electrode begins to draw excessive current, the current in the current circuit and through the current winding 42 will increase in such a direction as to cause the winch 25 to raise the electrode 12, increasing electrode voltage and decreasing electrode current until the predetermined current-voltage relationship is reestablished.

If the electrode arc becomes too long, electrode voltage will increase causing a relatively increased current flow in the voltage winding 54 as compared to the current winding 42 and thus causing the winch 25 to lower the electrode 12.

In accordance with the present invention, rheostates $R_1$ and $R_4$ are adjusted so that with contact 100 of relay 102 open, the currents in windings 42 and 54 will be balanced with the electrode at optimum position corresponding to a predetermined optimum arc length for maximum efficiency of power delivery to the electrode.

In order to reduce the danger of damage to the electrode and to limit heating losses due to large current swings at a low power factor, the control circuit so far described may be altered by closure of contact 100 in response to current surges in the line 30 above a predetermined value. When contact 100 of relay 102 is closed the resistance in the current circuit is reduced with the result that a larger current flows for a given current to the electrode 12. The result of this larger current signal is to cause the winch 25 to raise the electrode 12 to a higher position with a longer arc than the predetermined optimum arc length. The longer arc will melt a larger diameter hole in the scrap thus reducing the chances of a cave-in and tending to prevent possible damage to the electrode. The high arc position which is established with contact 100 closed can be selected by proper selection of resistor $R_2$ so as to make any diameter hole desired in the scrap.

In the illustrated embodiment, current surges in the electrode line 30 produce a positive potential between lines 83 and 84. For current surges above a predetermined value, voltages above a predetermined value are produced between lines 83 and 84 of polarity to actuate the relay 110 through adjustable resistor $R_3$ and rectifier $X_3$. It will be observed that because of the rectifier $X_3$, only an excess of current in the current winding 42 will actuate the relay 110. For excessively high electrode voltages line 83 will be negative with respect to line 84, and rectifier $X_3$ will block current flow through the relay coil 110. Resistor $R_3$ is adjustable to adjust the value of voltage between lines 83 and 84 which is required to actuate the relay 110. Thus relay 110 is actuated only in response to current surges above a predetermined value.

Upon energization of relay 110, contact 115 is momentarily opened setting adjustable timer 118 in operation. Actuation of adjustable timer 118 by momentary opening of contact 115 energizes relay 102 for a predetermined adjustable timer period during which contact 100 is closed. At the end of the timing period of the timer 118, relay 102 is deenergized, and contact 100 is opened, unless the relay 110 has again been actuated.

The timer 118 may be of the type which is reset to the beginning of its timing period each time the contact 115 is momentarily opened, and in this case, contact 100 will remain closed so long as current surges occur at intervals less than the timing period for which the timer 118 is set.

When the furnace settles down to a quiet operation without violent current surges, timer 118 times out deenergizing relay 102 and allowing contact 100 to open restoring the shorter optimum arc length for maximum power into the furnace. It is important to restore the optimum arc length as soon as possible, since the longer arc if continued for an extended period of time might produce a loss of refractory.

Summary of Operation

Summarizing the operation of the control system of the present invention, during the initial melt down of scrap in the electric furnace, as the scrap slides into the melt 13, successive current surges are produced of sufficient value to unbalance the current winding 42 with respect to the voltage winding 54 of the control generator 43. This results in a positive voltage of line 83 from winch generator 81 with respect to line 84 sufficient to momentarily actuate the relay 110 momentarily opening contact 115 and starting a timing cycle of the adjustable timer 118. During the timing cycle, relay 102 is energized closing contact 100 and thus producing an artificially high current signal in the current winding 42. The artificially high current signal in the current winding 42 causes winch 25 to raise the electrode 12 to a position above the position normally maintained by the system so as to provide a longer arc during the melt down process when violent shifts of the scrap are occuring.

As soon as the furnace settles down to a quiet operation, current surges in the electrode line 30 are of reduced value and do not produce a sufficient voltage between lines 83 and 84 of the winch generator to actuate relay 110. The timer 118 now times out opening contact 100 and restoring normal operation of the control circuit where the electrode 112 is positioned to provide an optimum arc length for maximum power delivery to the furnace and maximum efficiency of operation.

The resistor $R_3$ is adjustable to select the magnitude of current surge required to actuate relay 110, and proper selection of the resistor $R_2$ provides any desired length of arc during the melt down period. The longer arc will melt a larger diameter hole in the scrap and thus reduce the chances of a violent cave-in with possible damage to the electrode. As soon as possible, the optimum arc length is restored since the longer arc if continued for an extended period of time would cause an unnecessary damage to the refractory lining of the furnace.

It will be apparent that many modifications and variations may be effected without departing from the scope of the novel concepts of the present invention.

I claim as my invention:

1. An electric arc furnace control system for controlling the position of an electrode in the furnace comprising control means normally operative to maintain a predetermined current-voltage relation at the electrode corresponding to a first arc length, and surge responsive means responsive to a current surge above a predetermined value to alter said control means whereby the control means tends to maintain a different current-voltage relation at said electrode corresponding to a second arc length substantially greater than said first arc length, said surge responsive means including timing means for controlling the length of time which said responsive means is operative to alter said control means in the absence of further current surges.

2. The method of controlling electrode position in an electric arc furnace which comprises normally maintaining said electrode at an optimum position for optimum efficiency of operation, moving said electrode away from optimum position in response to current surges and maintaining said electrode away from said optimum position for a predetermined time period after each of said current surges to tend to provide a greater spacing of the electrode from the material being melted so long as large pieces of material are shifting in position in the furnace, and returning said electrode to said optimum position in the absence of repeated current surges within said predetermined time period.

3. An electric arc furnace system comprising an electrode mounted for vertical movement relative to the furnace, winch means for raising and lowering said electrode, a reversible winch motor for driving said winch means, winch generator means for energizing said winch motor and having a winch generator field winding, control generator means for energizing said winch generator field winding and having differentially acting current and voltage field windings, said control generator means being operative to drive said winch to raise said electrode in response to an excess current flow in said current field winding thereof and to lower said electrode in response to excess current flow in said voltage field winding thereof, current and voltage circuits coupled to said electrode and to said current and voltage windings respectively for producing current flow in the respective windings in accordance with the current and voltage at said electrode, impedance altering means for altering the impedance of one of said current and voltage circuits to change the current flow therein for a given electrode current or voltage, and means coupled to said impedance altering means and responsive to a surge in the flow of power to said electrode above a predetermined value to actuate said impedance altering means whereby said control generator tends to maintain said electrode at a position corresponding to a longer arc length.

4. An electric arc furnace system comprising an electrode mounted for vertical movement relative to the furnace, winch means for raising and lowering said electrode, a reversible winch motor for driving said winch means, winch generator means for energizing said winch motor and having a winch generator field winding, control generator means for energizing said winch generator field winding and having differentially acting current and voltage field windings, said control generator means being operative to drive said winch to raise said electrode in response to an excess current flow in said current field winding thereof and to lower said electrode in response to excess current flow in said voltage field winding thereof, current and voltage circuits coupled to said electrode and to said current and voltage windings respectively for producing current flow in the respective windings in accordance with the current and voltage at said electrode, impedance altering means for altering the impedance of one of said current and voltage circuits to change the current flow therein for a given electrode current or voltage, and means coupled to said impedance altering means and responsive to a surge in the flow of power to said electrode above a predetermined value to actuate said impedance altering means whereby said control generator tends to maintain said electrode at a position corresponding to a longer arc length, said impedance altering means comprising resistance means in one of said current and voltage circuits, relay means having contacts shunting said resistance, timer means controlling energization of said relay means, and means responsive to voltages of predetermined polarity and magnitude from the winch generator means to actuate said timer means.

5. An arc furnace system comprising a container having pieces of material for melting therein, a movable electrode for establishing an arc for melting said material, electrode position control means for sensing voltage and current values at said electrode and for normally maintaining said electrode at a position corresponding to a given current-voltage relationship and a given first length of arc and having a response time so as to substantially continuously maintain said first arc length in spite of relatively slow changes in the position of said material but being incapable of responding with sufficient rapidity to relatively faster changes in the position of said material such relatively faster changes in the position of said material exceeding the response time of said position control means, means for altering said position control means to maintain a second arc length substantially longer than said first arc length within the limits of the response time of said position control means, means responsive to surges in the relative current-voltage condition at said electrode reflecting a relatively rapid decrease in the spacing between the material and the electrode exceeding the response time of the control means for activating said altering means, and timing means for maintaining said altering means activated for a predetermined time period each time the altering means is activated in the absence of further surges and providing for deactivation of said altering means after the expiration of said time period in the absence of a further surge.

References Cited in the file of this patent

UNITED STATES PATENTS

| 2,456,936 | Frostick | Dec. 21, 1948 |
| 2,889,386 | Gruber et al. | June 2, 1959 |
| 2,942,138 | Carr et al. | June 21, 1960 |

FOREIGN PATENTS

| 640,633 | Great Britain | July 26, 1950 |